(12) United States Patent
Hashimoto et al.

(10) Patent No.: US 12,533,979 B2
(45) Date of Patent: Jan. 27, 2026

(54) COMPUTING DEVICE, VEHICLE SYSTEM, AND METHOD

(71) Applicant: TOYOTA JIDOSHA KABUSHIKI KAISHA, Toyota (JP)

(72) Inventors: Toshiya Hashimoto, Miyoshi (JP); Kazuhisa Matsuda, Sunto-gun (JP); Fumihiko Nakamura, Susono (JP); Manabu Handa, Susono (JP); Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 869 days.

(21) Appl. No.: 17/862,597

(22) Filed: Jul. 12, 2022

(65) Prior Publication Data

US 2023/0029080 A1 Jan. 26, 2023

(30) Foreign Application Priority Data

Jul. 16, 2021 (JP) .................. 2021-118087

(51) Int. Cl.
*H02J 7/00* (2006.01)
*B60L 53/126* (2019.01)
*B60L 53/62* (2019.01)
*G01C 21/34* (2006.01)

(52) U.S. Cl.
CPC ............. *B60L 53/62* (2019.02); *B60L 53/126* (2019.02); *G01C 21/3469* (2013.01)

(58) Field of Classification Search
USPC ........................................................ 320/109
See application file for complete search history.

(56) References Cited

U.S. PATENT DOCUMENTS

| | | | |
|---|---|---|---|
| 2010/0106401 A1* | 4/2010 | Naito | B60L 53/00 701/533 |
| 2012/0161530 A1* | 6/2012 | Urano | H02J 50/90 307/104 |
| 2013/0345976 A1* | 12/2013 | Li | G01C 21/3476 701/533 |
| 2014/0214321 A1* | 7/2014 | Kawamata | G01C 21/3476 340/901 |
| 2019/0087753 A1* | 3/2019 | Ito | G06Q 50/40 |

FOREIGN PATENT DOCUMENTS

| | | |
|---|---|---|
| EP | 2 752 812 | 7/2014 |
| JP | 2013-069229 | 4/2013 |
| JP | 2015-50877 A | 3/2015 |
| WO | WO 2013/024521 A1 | 2/2013 |
| WO | WO 2018/180583 A1 | 10/2018 |

* cited by examiner

*Primary Examiner* — Samuel Berhanu
(74) *Attorney, Agent, or Firm* — Finnegan, Henderson, Farabow, Garrett and Dunner, LLP

(57) ABSTRACT

A computing device includes a CPU and a memory. A vehicle travels by consuming first electric power and second electric power. The first electric power is electric power, generation of a unit amount of which causes emission of a first amount of carbon dioxide. The second electric power is electric power, generation of a unit amount of which causes emission of a second amount of carbon dioxide, the second amount being smaller than the first amount. The CPU creates a charging plan based on a first ratio occupied by the second electric power in electric power supplied from a first charging position on a travel route of the vehicle.

14 Claims, 19 Drawing Sheets

FIG.4

| VEHICLE ID | DEPARTURE PLACE | DESTINATION | CURRENT SOC |
|---|---|---|---|
| V1 | M11 | M12 | S1 |
| V2 | M21 | M22 | S2 |
| ⋮ | ⋮ | ⋮ | ⋮ |

FIG.5

| REGION | REGION POSITION INFORMATION | TYPE OF CHARGER | CHARGER POSITION INFORMATION | FIRST ELECTRIC POWER | SECOND ELECTRIC POWER | CHARGING UNIT PRICE (YEN/kWh) | CHARGING TYPE |
|---|---|---|---|---|---|---|---|
| REGION A | P1 | CHARGER A1 | P11 | 80% | 20% | 40 YEN | WIRELESS |
| | | CHARGER A2 | P12 | 100% | 0% | 30 YEN | WIRELESS |
| | | CHARGER A3 | P13 | 50% | 50% | 50 YEN | WIRELESS |
| | | ... | ... | ... | ... | ... | ... |
| REGION B | P2 | CHARGER B1 | P21 | 20% | 80% | 35 YEN (NIGHTTIME−10 YEN) | WIRELESS |
| | | CHARGER B2 | P22 | 0% | 100% | 45 YEN (NIGHTTIME−10 YEN) | WIRELESS |
| | | CHARGER B3 | P23 | ... | ... | ... | ... |
| | | ... | ... | ... | ... | ... | ... |
| ... | ... | ... | ... | ... | ... | ... | ... |

FIG. 7

(A) PROVISIONAL CHARGING PLAN

| | TYPE | SCHEDULED ORDER OF PASSAGE TO DESTINATION | FIRST ELECTRIC POWER | SECOND ELECTRIC POWER | CHARGING UNIT PRICE (YEN/kWh) | TARGET AMOUNT OF CHARGING (TOTAL 20kWh) | AMOUNT OF CHARGING |
|---|---|---|---|---|---|---|---|
| REGION A | CHARGER A1 | 1 (15:30) | 80% | 20% | 40 YEN | 6kWh | AMOUNT OF CHARGING BEING LARGE |
| | CHARGER A2 | 2 (16:00) | 100% | 0% | 30 YEN | 6kWh | |
| | CHARGER A3 | 3 (17:30) | 50% | 50% | 50 YEN | 7kWh | |
| REGION B | CHARGER B1 | 4 (20:00) | 20% | 80% | 35 YEN (NIGHTTIME-10 YEN) | 0kWh | AMOUNT OF CHARGING BEING SMALL |
| | CHARGER B2 | 5 (23:00) | 0% | 100% | 45 YEN (NIGHTTIME-10 YEN) | 0kWh | |

(B) CHARGING PLAN

| | TYPE | SCHEDULED ORDER OF PASSAGE TO DESTINATION | FIRST ELECTRIC POWER | SECOND ELECTRIC POWER | CHARGING UNIT PRICE (YEN/kWh) | TARGET AMOUNT OF CHARGING (TOTAL 20kWh) | AMOUNT OF CHARGING |
|---|---|---|---|---|---|---|---|
| REGION A | CHARGER A1 | 1 (15:30) | 80% | 20% | 40 YEN | 2kWh | AMOUNT OF CHARGING BEING SMALL |
| | CHARGER A2 | 2 (16:00) | 100% | 0% | 30 YEN | 1kWh | |
| | CHARGER A3 | 3 (17:30) | 50% | 50% | 50 YEN | 3kWh | |
| REGION B | CHARGER B1 | 4 (20:00) | 20% | 80% | 35 YEN (NIGHTTIME-10 YEN) | 7kWh | AMOUNT OF CHARGING BEING LARGE |
| | CHARGER B2 | 5 (23:00) | 0% | 100% | 45 YEN (NIGHTTIME-10 YEN) | 7kWh | |

FIG.16

| REGION | REGION POSITION INFORMATION | FIRST ELECTRIC POWER | SECOND ELECTRIC POWER | CHARGING UNIT PRICE (YEN/kWh) | CHARGING TYPE |
|---|---|---|---|---|---|
| REGION A | P1 | 80% | 20% | 40 YEN | WIRELESS CHARGING |
| REGION B | P2 | 20% | 80% | 35 YEN | WIRELESS CHARGING |
| REGION C | P3 | 10% | 90% | 45 YEN | WIRELESS CHARGING |
| ⋮ | ⋮ | ⋮ | ⋮ | ⋮ | ⋮ |

COMPUTING DEVICE, VEHICLE SYSTEM, AND METHOD

This nonprovisional application is based on Japanese Patent Application No. 2021-118087 filed with the Japan Patent Office on Jul. 16, 2021, the entire contents of which are hereby incorporated by reference.

BACKGROUND

Field

The present disclosure relates to a computing device, a vehicle system, and a method.

Description of the Background Art

Japanese Patent Laying-Open No. 2013-69229 discloses an information providing apparatus that provides information on a charging infrastructure to a user of an electric vehicle. This information providing apparatus preferentially provides the user with information on the charging infrastructure that contributes to electric power supply of a prescribed attribute.

SUMMARY

Japanese Patent Laying-Open No. 2013-69229, however, does not consider a charging plan for a vehicle that travels by consuming electric power. Therefore, there may be a problem that the user has to consider the charging plan for the vehicle.

The present disclosure was made to solve the problem above, and an object of the present disclosure is to create a charging plan for a vehicle that travels by consuming electric power.

A computing device according to the present disclosure includes a processor and a memory. The processor creates a travel route of a vehicle and a charging plan on the travel route. A program executable by the processor is stored in the memory. The vehicle travels by consuming first electric power and second electric power. Generation of a unit amount of the first electric power causes emission of a first amount of carbon dioxide. Generation of the unit amount of the second electric power causes emission of a second amount of carbon dioxide, the second amount being smaller than the first amount. The processor creates the charging plan based on a first ratio occupied by the second electric power in electric power supplied from a first charging position on the travel route of the vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing a vehicle information database.

FIG. 5 is a diagram showing a charging information database.

FIG. 7 is a diagram showing a charging plan.

FIG. 16 is a diagram showing the charging information database in another embodiment.

DESCRIPTION OF THE PREFERRED EMBODIMENTS

Figure 1:
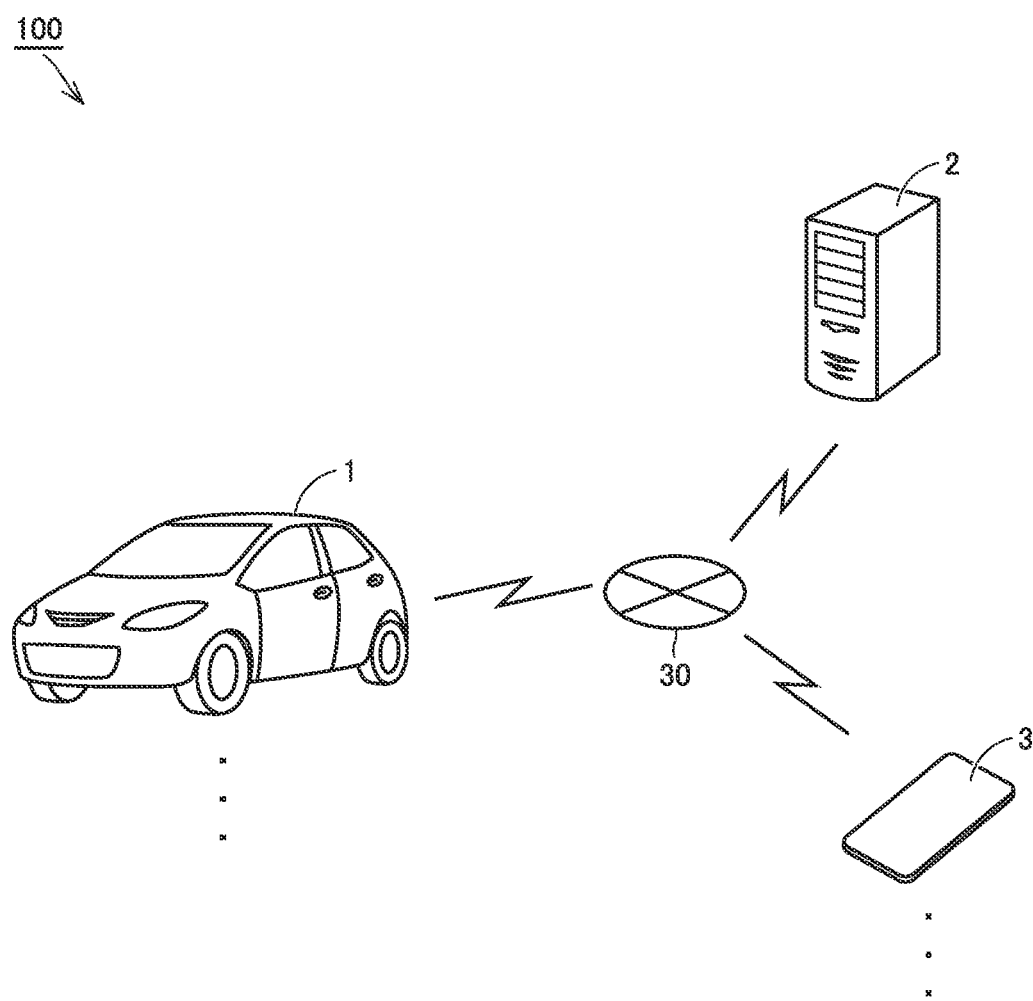
FIG. 1 is a diagram schematically showing an overall configuration of a vehicle system.

An embodiment of the present disclosure will be described in detail below with reference to the drawings. The same or corresponding elements in the drawings have the same reference characters allotted and description thereof will not be repeated.

First Embodiment

<System Configuration>

FIG. 1 is a diagram schematically showing an exemplary overall configuration of a vehicle management system according to an embodiment of the present disclosure. A vehicle system 100 includes a plurality of vehicles 1, a server 2, and a plurality of user terminals 3.

Each of the plurality of vehicles 1 is an electrically powered vehicle incorporating a battery for traveling, and it is, for example, an electric vehicle (EV), a hybrid electric vehicle (HEV), or a plug-in hybrid electric vehicle (PHEV). Each vehicle 1 is configured to receive wirelessly or by contact, electric power from a charger 9 (see FIG. 8 or the like) placed on a road surface of a travel road.

Server 2 manages the plurality of vehicles 1. Latest road information (a road information database which will be described later) and information on charger 9 (a charging information database which will be described later) are held in server 2.

Each of the plurality of user terminals 3 is a terminal operated by a user of vehicle 1, and it is, for example, a smartphone. The user can search for a travel route of vehicle 1 by inputting a destination of vehicle 1 by operating user terminal 3. Vehicle 1, server 2, and user terminal 3 are configured to bidirectionally communicate with each other over a network 30 such as the Internet. The user is, for example, a driver or a passenger of vehicle 1.

Figure 2:
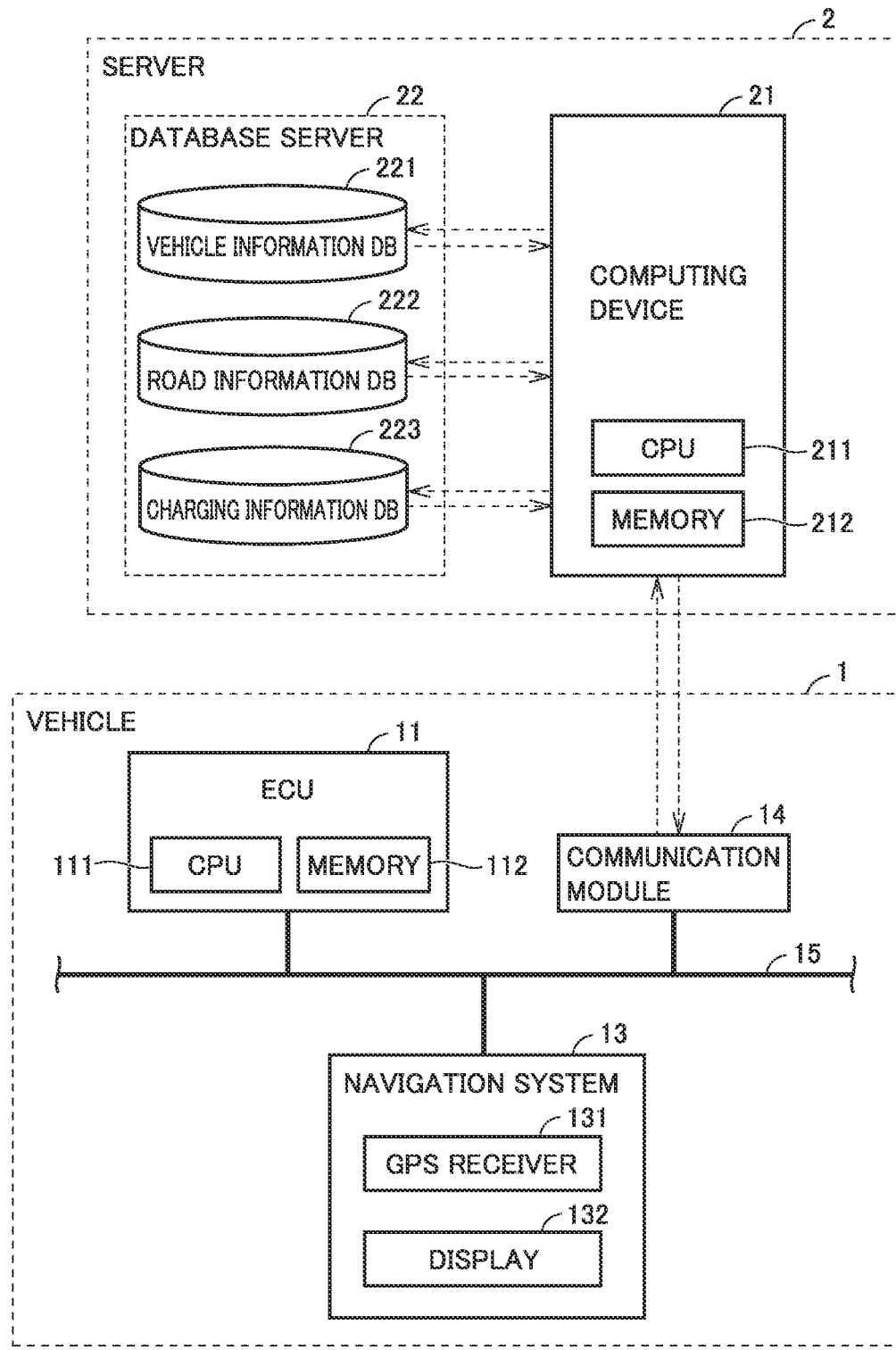
FIG. 2 is a block diagram showing in further detail, a configuration of a vehicle and a server.

FIG. 2 is a block diagram showing in further detail, a configuration of vehicle 1 and server 2. Vehicle 1 will initially be described. Vehicle 1 includes an electronic control unit (ECU) 11, a navigation system 13, and a communication module 14. ECU 11, navigation system 13, and communication module 14 can communicate with one another over a vehicle-mounted network 15 such as a controller area network (CAN).

ECU 11 includes a central processing unit (CPU) 111 and a memory 112. Memory 112 includes a read only memory (ROM) and a random access memory (RAM).

CPU 111 is configured to perform prescribed computing processing described in a program. A program executed by CPU 111 is stored in memory 112. Data generated by execution of a program by CPU 111 and data provided from vehicle-mounted network 15 are temporarily stored in memory 112. CPU 111 controls each device in vehicle 1 such that vehicle 1 is in a desired state, based on detection values from various sensors (not shown) and a program stored in memory 112. CPU 111 generates various types of information transmitted and received to and from server 2.

Navigation system 13 includes a processor and a memory (neither of which is shown), a global positioning system (UPS) receiver 131, and a display 132 with a touch panel.

GPS receiver 131 specifies a position of vehicle 1 based on radio waves from an artificial satellite (not shown). Various types of information are shown on display 132 and display 132 accepts various operations by a user. More specifically, on display 132, a road map around vehicle 1, a travel route from a departure place to a destination, a current position of vehicle 1, and a position of placement of charger 9 are shown.

Communication module 14 is a vehicle-mounted data communication module (DCM) and configured such that ECU 11 and server 2 bidirectionally communicate with each other.

Server 2 includes a computing device 21 and a database server 22. Database server 22 includes a vehicle information database 221, a road information database 222, and a charging information database 223. Computing device 21 includes a CPU 211 and a memory 212. CPU 211 creates a travel route of the vehicle and a charging plan on the travel route. CPU 211 corresponds to the "processor" in the present disclosure. A program executable by the processor is stored in memory 212.

Computing device 21 collects position information (GPS information) and latest state-of-charge (SOC) information of each of the plurality of vehicles 1. The information is regularly transmitted from each vehicle 1 to server 2. Computing device 21 has the collected information stored in vehicle information database 221. Associated information on a type, a model year, a model, specifications, and a state (for example, a state of deterioration and a full charge capacity of a battery) of each vehicle 1 is also stored in vehicle information database 221. Computing device 21 may obtain records of travel of each vehicle 1 or more specifically data on power consumption measured during travel of each vehicle 1 for each of various travel conditions (a travel route, a date, day of the week, weather, an air temperature, or the like) and have them stored in vehicle information database 221.

Road information is stored in road information database 222. Information on specifications of the charger (for example, a charging type, power feeding capability, or the like), a location of placement of the charger is stored in charging information database 223. The road may newly be constructed or a geometry of the road may be changed. In addition, charger 9 may newly be placed or existing charger 9 may be decommissioned. Therefore, information stored in road information database 222 and charging information database 223 is regularly updated to a latest state by a manager of server 2.

As will be described later, computing device 21 creates the travel route of vehicle 1 and the charging plan for vehicle 1 on the travel route. The charging plan refers to information that defines charger 9 by which vehicle 1 is charged and an amount of charging by charger 9.

Computing device 21 transmits the created travel route and charging plan to vehicle 1. When vehicle 1 receives the travel route from computing device 21, navigation system 13 shows the travel route on display 132. ICU 11 of vehicle 1 carries out charging based on the charging plan.

<On-Road Power Reception>

Figure 3:
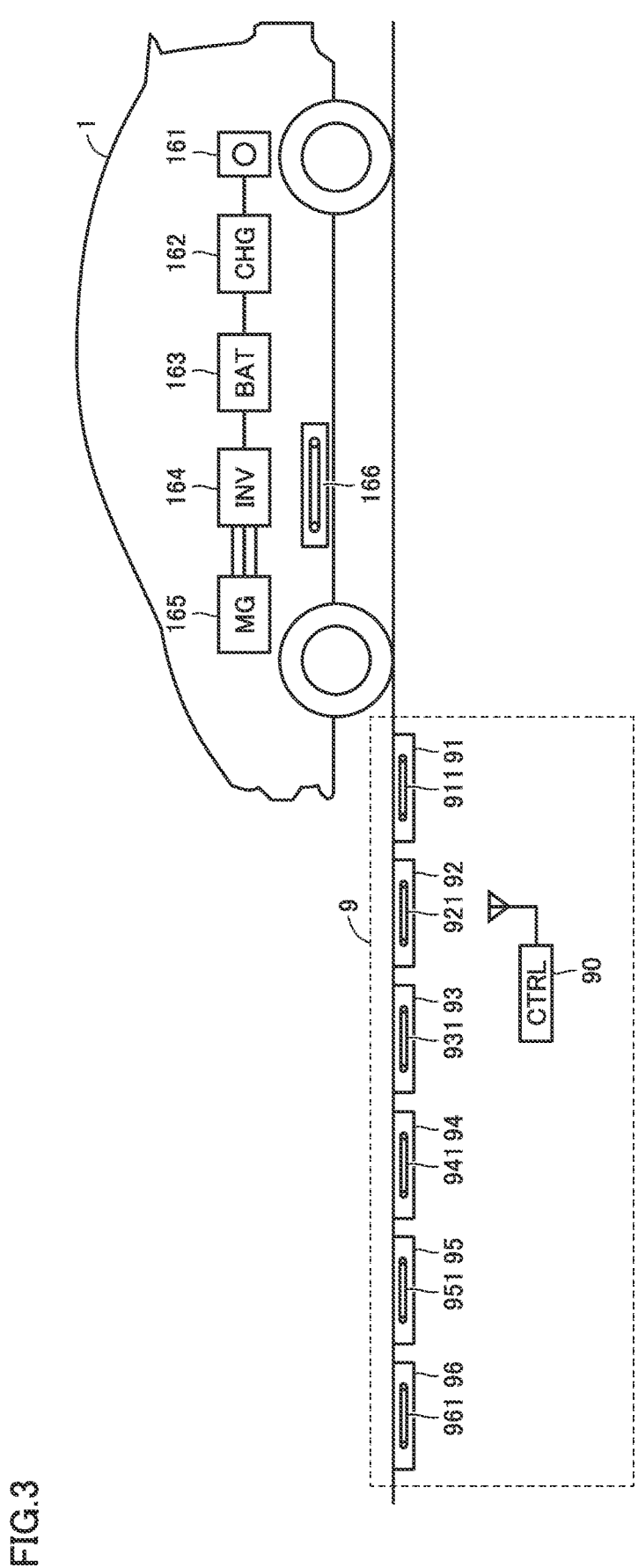
FIG. 3 is a diagram schematically showing a configuration of the vehicle charger.

FIG. 3 is a diagram schematically showing an exemplary configuration of vehicle 1 and charger 9. Vehicle 1 further includes an inlet 161, a power conversion device 162, a battery 163, an inverter 164, a motor generator 165, and a power reception apparatus 166 in addition to components shown in FIG. 2.

Inlet 161 is arranged in the inside of a charge lid (not shown) provided in an exterior of vehicle 1. Inlet 161 is configured such that a charging connector provided at a tip end of a charging cable extending from charger 9 can be inserted therein. As the charging connector is inserted in inlet 161, inlet 161 and charger 9 are electrically connected to each other so that electric power can be transmitted from charger 9 to vehicle 1 (contact charging).

When alternating-current (AC) power is supplied from inlet 161, power conversion device 162 converts AC power into direct-current (DC) power and supplies resultant DC power to battery 163.

Battery 163 is a battery assembly including a plurality of cells. Each cell is a secondary battery such as a lithium ion battery or a nickel metal hydride battery. Battery 163 supplies electric power for generating driving force of vehicle 1 to motor generator 165. Electric power generated by motor generator 165 is stored in battery 163. Battery 163 is provided with a voltage sensor and a current sensor (neither of which is shown) for calculation of the SOC of battery 163 by ECU 11.

Inverter 164 converts DC power stored in battery 163 to AC power and supplies resultant AC power to motor generator 165. Inverter 164 converts AC power (regenerative power) from motor generator 165 to DC power so that battery 163 is charged with DC power. Inverter 164 further converts AC power received by power reception apparatus 166 to DC power so that battery 163 is charged with DC power.

Motor generator 165 has vehicle 1 travel by receiving supply of electric power from inverter 164 and providing rotational force to a drive wheel.

In an example shown in FIG. 3, power reception apparatus 166 is arranged on a lower surface of a floor panel that forms a bottom surface of vehicle 1. A power reception coil is accommodated in power reception apparatus 166. The power reception coil wirelessly receives electric power transmitted from charger 9.

Charger 9 includes a plurality of power transmission units 91 to 96 and a controller 90. Though FIG. 3 shows an example in which six power transmission units are provided, the number of power transmission units is not particularly limited and a larger number of power transmission units may be provided.

The plurality of power transmission units 91 to 96 are arranged in line on the road surface. The plurality of power transmission units 91 to 96 include power transmission coils 911 to 961, respectively. Power transmission coils 911 to 961 are electrically connected to an AC power supply (not shown). Though not shown, each of the plurality of power transmission units 91 to 96 is provided with a sensor (an optical sensor, a weight sensor, or the like) that detects passage of vehicle 1.

Controller 90 specifies a position of traveling of vehicle 1 based on a detection signal from each sensor. Then, controller 90 has AC power from the AC power supply supplied to a power transmission coil in a power transmission unit above which vehicle 1 is located, among power transmission units 91 to 96.

More specifically, when vehicle 1 is detected, for example, above power transmission unit 91, controller 90 has AC power supplied to power transmission coil 911. Then, an AC current flows through power transmission coil 911, so that electromagnetic field is formed around power transmission coil 911. The power reception coil within power reception apparatus 166 wirelessly receives electric power through the electromagnetic field. Thereafter, when vehicle 1 is no longer detected above power transmission unit 91, controller 90 stops supply of AC power to power transmission coil 911. As such a series of control is carried out for each of power transmission units 91 to 96, electric power can wirelessly be transmitted to traveling vehicle 1 (on-road power reception). As set forth above, vehicle 1 can be charged in any of contact charging and wireless charging.

Vehicle 1 travels by consuming first electric power and second electric power. First electric power refers to electric power, generation of a unit amount of which causes emission of a first amount of carbon dioxide. The unit amount is determined in advance. Second electric power refers to electric power, generation of the unit amount of which causes emission of a second amount of carbon dioxide, the second amount being smaller than the first amount. In other words, second electric power is smaller than first electric power in amount of carbon dioxide emitted during generation thereof.

First electric power is generated, for example, from depletable energy. Depletable energy includes, for example, petroleum, natural gas, oil sand, methane hydrate, and uranium.

Second electric power is generated, for example, from renewable energy. Renewable energy includes, for example, energy of wind power, solar rays, waterpower, biomass, and the like.

Therefore, from a point of view of global environmental protection, charging with second electric power is more preferable than charging with first electric power. Electric power supplied by charger 9 in the present disclosure is composed of A % of first electric power and B % of second electric power, where A and B are real numbers not smaller than 0 and not larger than 100 and a total of A and B is equal to 100. A and B are defined by a ratio of first electric power and a ratio of second electric power in FIG. 5 which will be described later.

In a modification, first electric power and second electric power may both be generated from depletable energy. In this case again, second electric power is electric power, generation of the unit amount of which causes emission of the second amount of carbon dioxide, the second amount being smaller than the first amount. Alternatively, first electric power and second electric power may both be generated from renewable energy. In this case again, second electric power is electric power, generation of the unit amount of which causes emission of the second amount of carbon dioxide, the second amount being smaller than the first amount.

Computing device 21 creates a charging plan based on a ratio occupied by second electric power (which is also referred to as a "ratio of second electric power" or a "first ratio" below) in electric power supplied from a charging position on the travel route of vehicle 1. The first ratio is expressed as B/100. In the present embodiment, computing device 21 creates the charging plan to carry out charging by the charger when the first ratio is equal to or higher than a prescribed value. Therefore, the ratio of second electric power in electric power for charging of vehicle 1 can be increased, which contributes to global environmental protection.

Vehicle 1 switches to any one of an ordinary drive mode and a drive support mode. The ordinary drive mode refers to a mode in which a vehicle is driven by a driving operation by a driver of vehicle 1. The drive support mode refers to a mode in which a support apparatus (not shown) mounted on vehicle 1 drives vehicle 1. The drive support mode includes a first drive support mode in which a driving operation by a user is not accepted and a second drive support mode in which a driving operation by the user is accepted. The first drive support mode is the mode in which the driving operation by the user is not accepted. Therefore, the first drive support mode is a mode in which vehicle 1 moves by autonomous driving by vehicle 1 without the driving operation by the user. The second drive support mode is the mode in which the driving operation by the user is accepted. Therefore, the second drive support mode is the mode in which vehicle 1 moves based on autonomous driving by vehicle 1 and the driving operation by the user. For example, in the second drive support mode, vehicle 1 stops when the user applies a brake during movement by autonomous driving by vehicle 1.

<Database>

Each database will now be described. FIG. 4 is a diagram showing an exemplary updated vehicle information database 221. In an example in FIG. 4, a departure place, a destination, and a current SOC are associated with each vehicle ID. Processing unit 54 updates a record (the departure place, the destination, and the current SOC) corresponding to the vehicle ID.

In the example in FIG. 4, a record including a departure place M11, a destination M12, and a current SOC S1 is stored as a record for a vehicle ID V1. A record including a departure place M21, a destination M22, and a current SOC S2 is stored as a record for a vehicle ID V2. Before the vehicle information database is updated, the vehicle ID has been stored, whereas no record corresponding to the vehicle ID has been stored. FIG. 4 and FIG. 5 which will be described later show ellipsis points " . . . " which means that information is actually stored but not shown.

FIG. 5 is a diagram schematically showing an exemplary charging information database. In an example in FIG. 5, a "region" is defined. The region represents an area of a land. For example, the region may be an area for each "prefecture", an area for each "city", or an area for each "ward". For a contiguous continent (for example, the European continent), the region may be an area for each "country".

In the example in FIG. 5, region position information, a type of the charger, a position of the charger, the ratio of second electric power, the ratio of first electric power, a charging unit price, and a charging type are associated with each region.

The region position information is information indicating a position in a region associated therewith. The region position information is information defining, for example, a range of latitudes of the region and a range of longitudes of the region. In the example in FIG. 5, region position information P1 is stored in association with a region A. In the example in FIG. 5, region position information P2 is stored in association with a region B.

The type of the charger is information defining the type of the charger placed in the region associated therewith. The example in FIG. 5 shows that a charger A1, a charger A2, a charger A3, and the like are placed in region A and that a charger B1, a charger B2, a charger B3, and the like are placed in region B. The position of the charger is also referred to as a "charging position."

The charger position information is information indicating the position of the charger associated therewith. The charger position information is information defining, for example, the latitude and the longitude of the position of the charger. In the example in FIG. 5, charger position information P11 is stored in association with charger A1. In the example in FIG. 5, charger position information P21 is stored in association with charger B1.

The ratio of first electric power and the ratio of second electric power represent ratios of first electric power and second electric power in electric power supplied by the charger associated therewith. For example, for charger A1, the ratio of first electric power is defined as 80% and the ratio of second electric power is defined as 20%. For charger A2, the ratio of first electric power is defined as 100% and the ratio of second electric power is defined as 0%. For charger B1, the ratio of first electric power is defined as 20% and the ratio of second electric power is defined as 80%.

The charging unit price is information defining a fee of the charger associated therewith. In the example in FIG. 5, yen/kWh is defined. In the example in FIG. 5, the charging unit price of charger A1 is defined as 40 yen/kWh. The charging unit price of charger A2 is defined as 30 yen/kWh. The example in FIG. 5 shows that, for charger B1 and charger B2, a nighttime fee is 10 yen cheaper.

The charging type is information defining whether the charger associated therewith is adapted to contact charging or wireless charging. The example in FIG. 5 shows that all chargers are adapted to wireless charging.

Though road information database 222 is not particularly shown, for example, it defines a geometry of a road, a length of a road, a position of a traffic signal, and the like.

<Functional Block Diagram of Computing Device>

Figure 6:
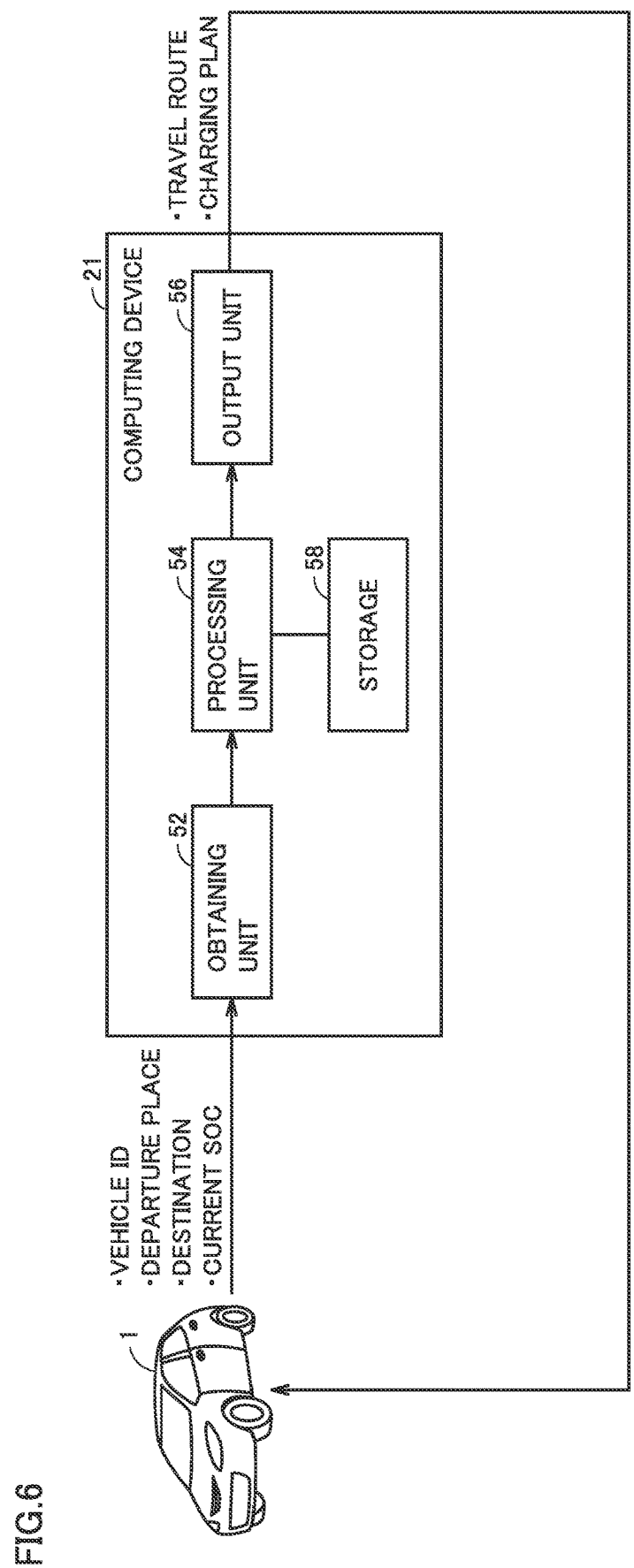
FIG. 6 is a functional block diagram of a computing device.

FIG. 6 is a functional block diagram of computing device 21. In an example in FIG. 6, computing device 21 includes an obtaining unit 52, a processing unit 54, an output unit 56, and a storage 58.

When a predetermined start condition is satisfied, vehicle 1 transmits the vehicle ID, the departure place, the destination, and the current SOC of vehicle 1 to computing device 21. The start condition includes, for example, a condition that a user of vehicle 1 (which is also simply referred to as a "user" below) inputted the departure place and the destination into navigation system 13. Without an input, the current position of vehicle 1 may be defined as the departure place.

When vehicle 1 travels, for example, over a route the departure place and the destination of which have been determined, the start condition is satisfied by an operation to set the route by the user. For example, a cyclic bus falls under vehicle 1 that travels over the route the departure place and the destination of which have been determined.

Vehicle 1 may perform a function (a tracking function) to travel as following a vehicle ahead. In this case, the start condition is satisfied by an operation to activate the function by the user.

Obtaining unit 52 obtains the vehicle ID, the departure place, the destination, and the current SOC. The vehicle ID, the departure place, the destination, and the current SOC are provided to processing unit 54. Processing unit 54 updates the departure place, the destination, and the current SOC for the vehicle ID in vehicle information database 221 (see FIG. 4).

Processing unit 54 creates the travel route of the vehicle corresponding to the obtained vehicle ID based on the departure place and the destination. In the present embodiment, processing unit 54 creates one travel route. Furthermore, processing unit 54 creates a charging plan on the one travel route. A program for creating one travel route and a program for creating the charging plan have been stored in storage 58.

Then, output unit 56 outputs the travel route and the charging plan (a charging plan which will be described later) to vehicle 1. ECU 11 of vehicle 1 has the travel route and the charging plan stored in memory 112. In the present embodiment, processing unit 54 once creates a provisional charging plan and then creates a charging plan by modifying the provisional charging plan.

FIG. 7 is a diagram for illustrating an exemplary charging plan in the present embodiment. FIG. 7(A) shows an exemplary provisional charging plan and FIG. 7(B) shows an exemplary charging plan. FIG. 7(A) will initially be described. In an example in FIG. 7(A), a travel route that passes through region A and region B between the departure place and the destination is created. The example in FIG. 7(A) shows that charging is carried out by charger A1, charger A2, and charger A3 in region A. The example in FIG. 7(A) shows that charging is not carried out by charger B1 and charger B2 in region B.

The ratio of first electric power, the ratio of second electric power, and the charging unit price of each of charger A1, charger A2, charger A3, charger B1, and charger B2 are as shown in FIG. 5.

A target amount of charging is, for example, an amount of charging necessary for travel from the departure place to the destination along the travel route determined by processing unit 54. In the example in FIG. 7, the target amount of charging is 20 kWh.

In the example in FIG. 7 (A), the charging plan includes charging by an amount of electric power of 6 kWh by charger A1, charging by an amount of electric power of 6 kWh by charger A2, charging by an amount of electric power of 7 kWh by charger A3, and no charging by other chargers B1 and B2. The provisional charging plan in the present embodiment is created based on a prescribed algorithm. The prescribed algorithm is, for example, such an algorithm that, regardless of a first charging ratio, a second charging ratio, and the charging unit price, charging is carried out only by first to Mth (M being an integer not smaller than one) chargers and charging is not carried out by other chargers on the created travel route. This algorithm can be an algorithm of a relatively simplified configuration. In the present embodiment, M is set to 3, which means that charging is carried out only by first to third chargers (that is, chargers A1 to A3) and charging by other chargers (that is, charger B1 and charger B2) is not carried out. In other words, the provisional charging plan is such a charging plan that the amount of charging in region A is large whereas the amount of charging in region B is small.

This provisional charging plan, however, is high in ratio of first electric power in electric power for charging, and does not contribute to global environmental protection. Then, the provisional charging plan is modified to raise the ratio of second electric power in electric power for charging.

Specifically, with any charger being defined as a first charger, the ratio of second electric power in electric power supplied from the first charger is compared with a threshold value. The ratio of second electric power corresponds to the "first ratio" in the present disclosure. When the first ratio is equal to or higher than the threshold value, the charging plan is created with the amount of charging by the first charger being set to be larger than in the provisional charging plan.

Any method may be adopted for selection of the first charger. For example, an Nth (N being a predetermined natural number) charger on one created travel route may be selected. In the present embodiment, charger B1 is defined as the first charger on the created travel route. The threshold value is set to 60%.

In this case, in the example in FIG. 5, the ratio of second electric power of charger B1 is 80%. Therefore, processing unit 54 increases the amount of charging by charger B1 from 0 kWh to 7 kWh. Processing unit 54 performs other processing. Other processing is processing for determining another amount of charging, with another charger being defined as the first charger. Processing unit 54 thus creates the charging plan by modifying the provisional charging plan. In an example in FIG. 7 (B), in the charging plan, the target amount of charging by charger A1 is set to 2 kWh, the target amount of charging by charger A2 is set to 1 kWh, the target amount of charging by charger A3 is set to 3 kWh, the target amount of charging by charger B1 is set to 7 kWh, and the target amount of charging by charger B2 is set to 7 kWh.

Output unit 56 outputs information representing the charging plan in FIG. 7(B) to vehicle 1. Vehicle 1 travels while it carries out charging based on this charging plan.

Figure 8:
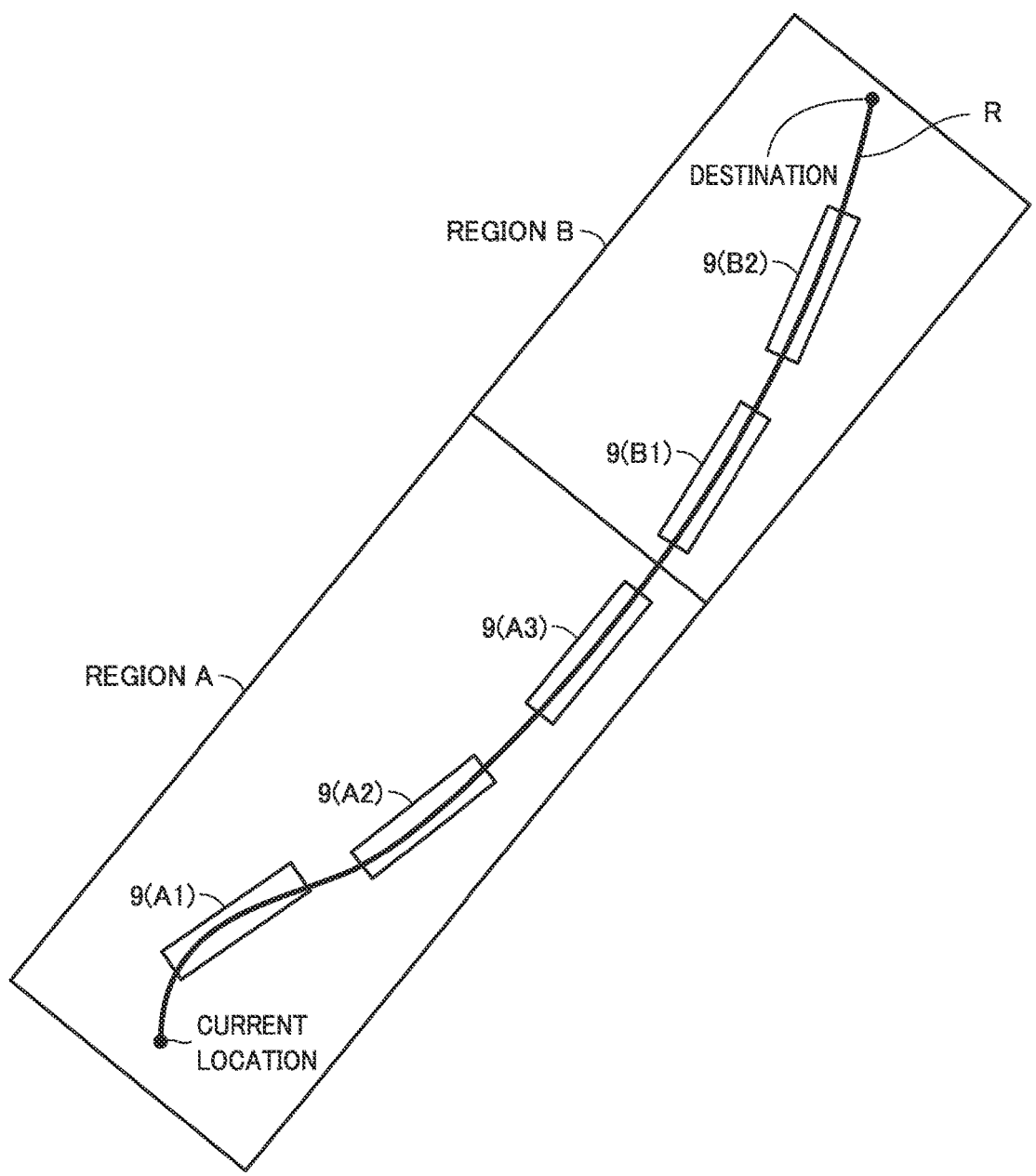
FIG. 8 is a diagram showing a travel route and a charging plan.

FIG. 8 is a diagram schematically showing a travel route R and the charging plan. An example in FIG. 8 shows chargers 9 labeled with reference characters A1, A2, A3, B1, and B2 shown in FIG. 7 in parentheses. The example in FIG. 8 shows region A and region B.

Figure 9:
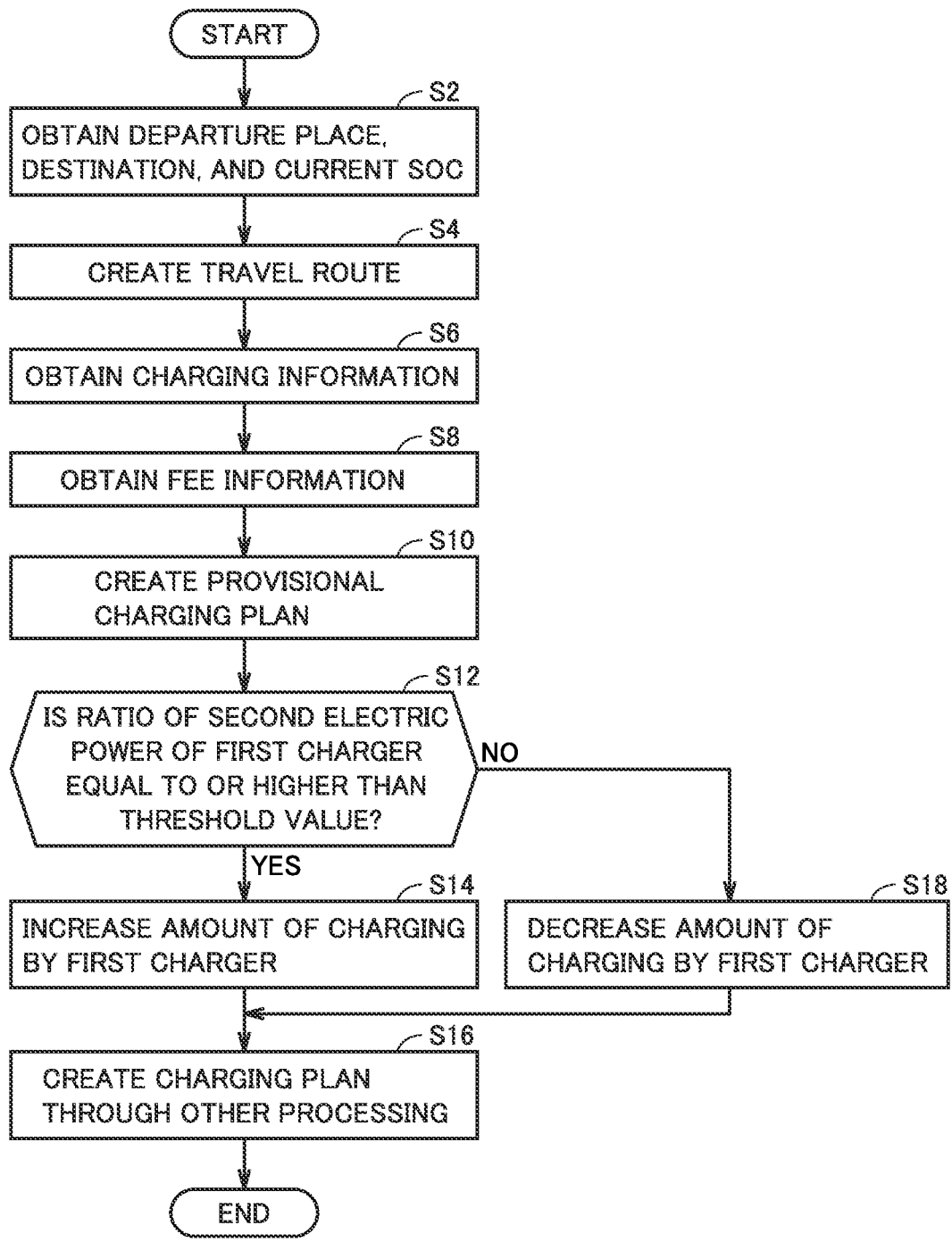
FIG. 9 is a flowchart showing a processing in the computing device.

FIG. 9 is a flowchart showing processing in computing device 21. Initially, in step S2, computing device 21 obtains the departure place, the destination, and the current SOC. Then, in step S4, computing device 21 creates one travel route. Computing device 21 calculates a necessary amount of charging (in the example in FIG. 7, 20 kWh) based on the travel route, the current SOC, and associated information described above.

Then, in step S6, computing device 21 obtains charging information from the charging information database stored in storage 58. The charging information is, for example, the ratio of first electric power and the ratio of second electric power described with reference to FIG. 5. Then, in step S8, computing device 21 obtains fee information from the charging information database stored in storage 58. The fee information is the charging unit price described with reference to FIG. 5.

Then, in step S10, computing device 21 creates the provisional charging plan. Then, in step S12, computing device 21 determines whether or not the ratio of second electric power of the first charger is equal to or higher than the threshold value. As described above, the Nth (N being a predetermined natural number) charger (for example, charger B1) on the created travel route is assumed as the first charger. In the example described above, the threshold value is set to 60%.

When determination as YES is made in step S12, the process proceeds to step S14. In step S14, computing device 21 increases the amount of charging by the first charger as compared with that in the provisional charging plan. In the example in FIG. 7, the amount of charging by charger B1 is increased from 0 kWh to 7 kWh.

When determination as NO is made in step S12, the process proceeds to step S18. In step S18, computing device 21 decreases the amount of charging by the first charger as compared with that in the provisional charging plan. For example, the amount of charging increased in step S14 or the amount of charging decreased in step S18 may be set to a fixed value or may be calculated in accordance with a prescribed mathematical expression.

When processing in step S14 or step S18 ends, the process proceeds to step S16. In step S16, computing device 21 creates the charging plan through other processing. Other processing is, for example, processing for determining the amount of charging another charger to lower the charging fee. In step S16, computing device 21 determines the amount of charging, for example, also for another charger, based on whether or not, the ratio of second electric power is equal to or higher than the threshold value. Through the processing in step S16, computing device 21 creates the charging plan.

The processing in step S16 is performed also in other flowcharts (FIGS. 10 to 12, 14, and 15). The processing in step S16 is necessary for creating the charging plan in each flowchart. In a modification, in step S16, computing device 21 may determine the amount of charging by another charger not based on the charging fee.

An information providing apparatus that provides information on a charging infrastructure to a user of an electric vehicle has conventionally been disclosed. This information providing apparatus preferentially provides the user with information on the charging infrastructure that contributes to electric power supply of a prescribed attribute. This conventional technique, however, does not consider a charging plan for a vehicle. Therefore, there may be a problem that the user has to consider the charging plan for the vehicle. Computing device 21 in the present embodiment creates the charging plan based on the first ratio (that is, the ratio of second electric power) occupied by second electric power in electric power supplied from the first charger (for example, charger B1) on the travel route of vehicle 1. Therefore, computing device 21 can create the charging plan (FIG. 7(B)) contributing to the global environmental protection without consideration of the charging plan for the vehicle by the user. In other words, computing device 21 can create a charging plan that can contribute to carbon neutrality.

When the ordinary drive mode or the second drive support mode has been set, the driver of vehicle 1 has vehicle 1 travel along the travel route shown on display 132 while the driver visually recognizes the travel route. When vehicle 1 travels along the travel route, vehicle 1 is charged under the charging plan on the travel route. When travel of vehicle 1 deviates from the travel route, computing device 21 may create again the travel route and the charging plan.

When the first drive support mode has been set, vehicle 1 travels along the created travel route. Therefore, in this case again, vehicle 1 is charged under the charging plan on the travel route.

Computing device 21 creates the provisional charging plan. Furthermore, when the first ratio (that is, the ratio of second electric power) in the provisional charging plan is equal to or higher than the threshold value (YES in step S12), computing device 21 creates the charging plan with the amount of charging at the first charging position being increased as compared with the amount of charging in the provisional charging plan. Therefore, while the provisional charging plan is created with the use of a relatively simplified algorithm, an appropriate charging plan can be created.

Computing device 21 creates the charging plan to lower the fee for charging vehicle 1, based on the fee information obtained in step S8 in FIG. 9. Therefore, computing device 21 can provide the user with the charging plan low in fee.

First electric power is generated from depletable energy and second electric power is generated from renewable energy. As described above, computing device 21 creates the charging plan such that the ratio of second electric power is equal to or higher than a prescribed value. Therefore, computing device 21 can achieve charging high in ratio of renewable energy.

The configuration in which all chargers for charging in the charging plan are adapted to wireless charging is described in the embodiment above. The charger for charging in the charging plan may include a charger adapted to contact charging. According to such a configuration as well, computing device 21 can create the charging plan in which charging higher in ratio of second electric power is carried out, and consequently can create the charging plan that can contribute to protection of the global environment.

A first modification of the first embodiment will now be described. FIG. 7 illustrates an example to create the charging plan in which the charger (for example, chargers A1, A2, and A3), the ratio of second electric power of which is lower than the prescribed value, carries out charging by a small amount. Computing device 21, however, may create a charging plan in which a charger, the ratio of second electric power of which is lower than the prescribed value, does not carry out charging. According to such a configuration as well, computing device 21 can create the charging plan in which charging higher in ratio of second electric power is carried out, and consequently can create the charging plan that can contribute to protection of the global environment.

A second modification of the first embodiment will now be described. The example above illustrates the configuration in which computing device 21 creates the provisional charging plan and thereafter creates the charging plan. Computing device 21, however, may directly create the charging plan without creating the provisional charging plan.

Figure 10:
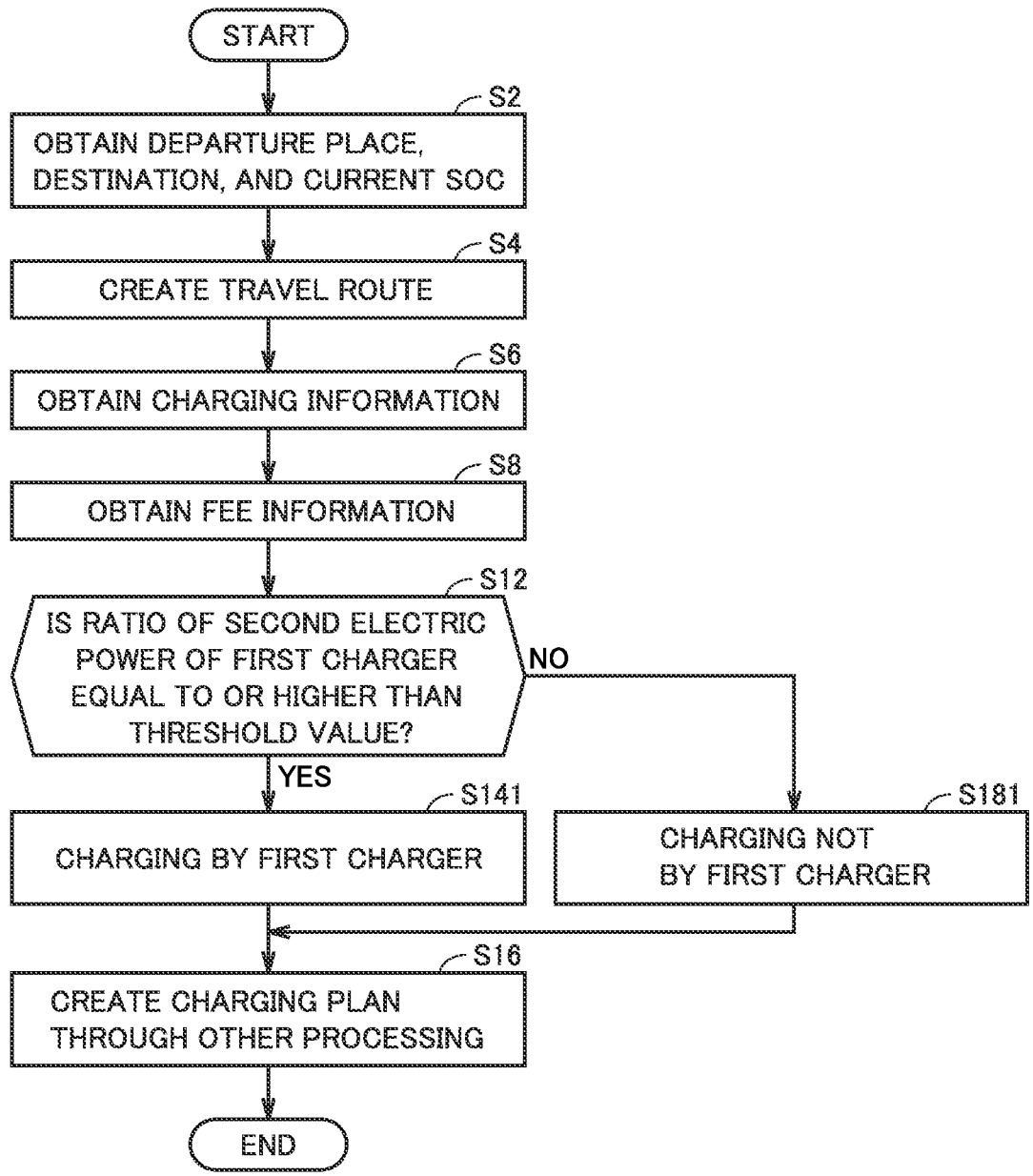
FIGS. 10 to 12 are each a flowchart showing processing in the computing device in other embodiments.

FIG. 10 is a flowchart of this second modification. When FIGS. 9 and 10 are compared with each other, in FIG. 10, step S10 is omitted, step S14 is replaced with step S141, and step S18 is replaced with step S181.

When determination as YES is made in step S12 after the end of step S8 in the flowchart in the modification in FIG. 10, in step S141, computing device 21 determines that charging by the first charger is to be carried out. The amount of charging by the first charger may be set to a prescribed amount or may be calculated in accordance with a prescribed mathematical expression.

When determination as NO is made in step S12, in step S181, computing device 21 determines that charging by the first charger is not to be carried out. The amount of charging by the first charger may be set to a prescribed amount or may be calculated in accordance with a prescribed mathematical expression. According to such a configuration as well, computing device 21 can create the charging plan in which charging higher in ratio of second electric power is carried out, and consequently can create the charging plan that can contribute to protection of the global environment.

Second Embodiment

The configuration in which "the ratio of second electric power of the first charger is compared" with the "threshold value" is described in the first embodiment. A configuration in which "the ratio of second electric power of the first charger is compared" with the "ratio of second electric power of a second charger," however, will be described. The second charger is a charger different from the first charger. In this embodiment, the first charger and the second charger are present on a single travel route created by computing device 21.

The Nth charger on one created travel route is defined as the first charger. An Lth charger on that one travel route is defined as the second charger. L is a predetermined natural number and different from N. For example, it is assumed that L is set to one. The second charger supplies electric power in which second electric power occupies a second ratio, the second ratio being higher than the first ratio.

Figure 11:
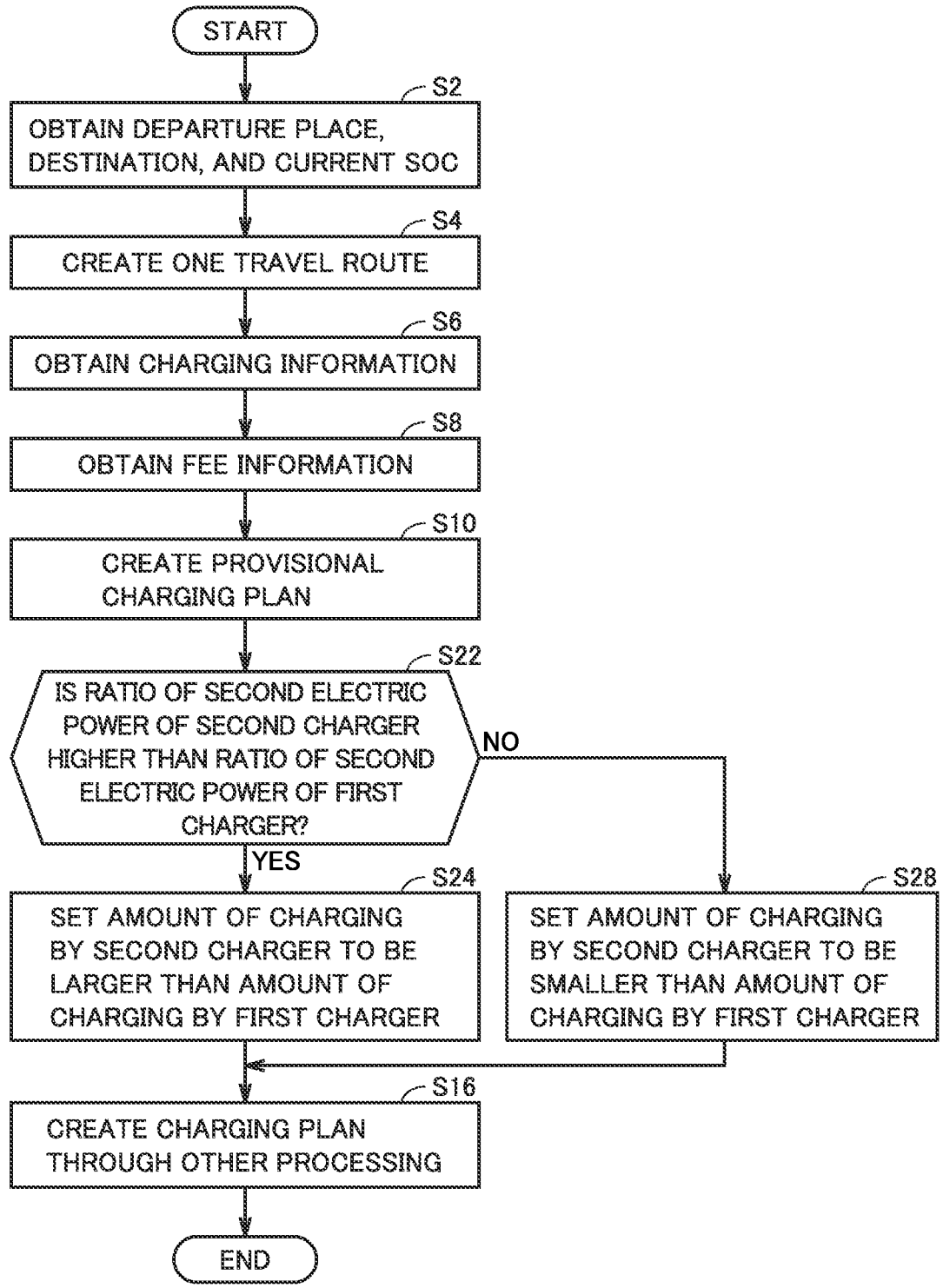

FIG. 11 is a flowchart of this second embodiment. When FIG. 9 is compared with FIG. 11, in FIG. 11, step S12 is replaced with step S22, step S14 is replaced with step S24, and step S18 is replaced with step S28.

When the processing in step S10 ends, in step S22, whether or not the second ratio (the ratio of second electric power) of the second charger is higher than the first ratio (the ratio of second electric power) of the first charger is determined. In the example in FIG. 5 or 7, the second ratio (80%) of the second charger (for example, charger B1) is determined as being higher than the first ratio (20%) of the first charger (for example, charger A1).

When determination as YES is made in step S22, the process proceeds to step S24. In step S24, computing device 21 sets the amount of charging by the second charger to be larger than the amount of charging by the first charger in the provisional charging plan. In the example in FIG. 7, computing device 21 decreases the amount of charging by charger A1 from 6 kWh to 2 kWh and increases the amount of charging by charger B1 from 0 kWh to 7 kWh. A decrement for the first charger and an increment for the second charger are calculated in accordance with a prescribed mathematical expression.

When determination as NO is made in step S22, the process proceeds to step S28. In step S28, computing device 21 sets the amount of charging by the second charger to be smaller than the amount of charging by the first charger in the provisional charging plan.

As described above, the first charger and the second charger are present on one created travel route. Then, computing device 21 creates the charging plan based on the above-described first ratio of the first charger and the above-described second ratio of the second charger. According to such a configuration as well, computing device 21 can create the charging plan in which charging higher in ratio of second electric power is carried out, and consequently can create the charging plan that can contribute to protection of the global environment.

In particular, in the example in FIG. 11, computing device 21 creates the charging plan in which the second charger is higher in ratio of second electric power than the first charger (step S24). According to such a configuration as well, computing device 21 can create the charging plan in which charging higher in ratio of second electric power is carried out, and consequently can create the charging plan that can contribute to protection of the global environment.

Figure 12:
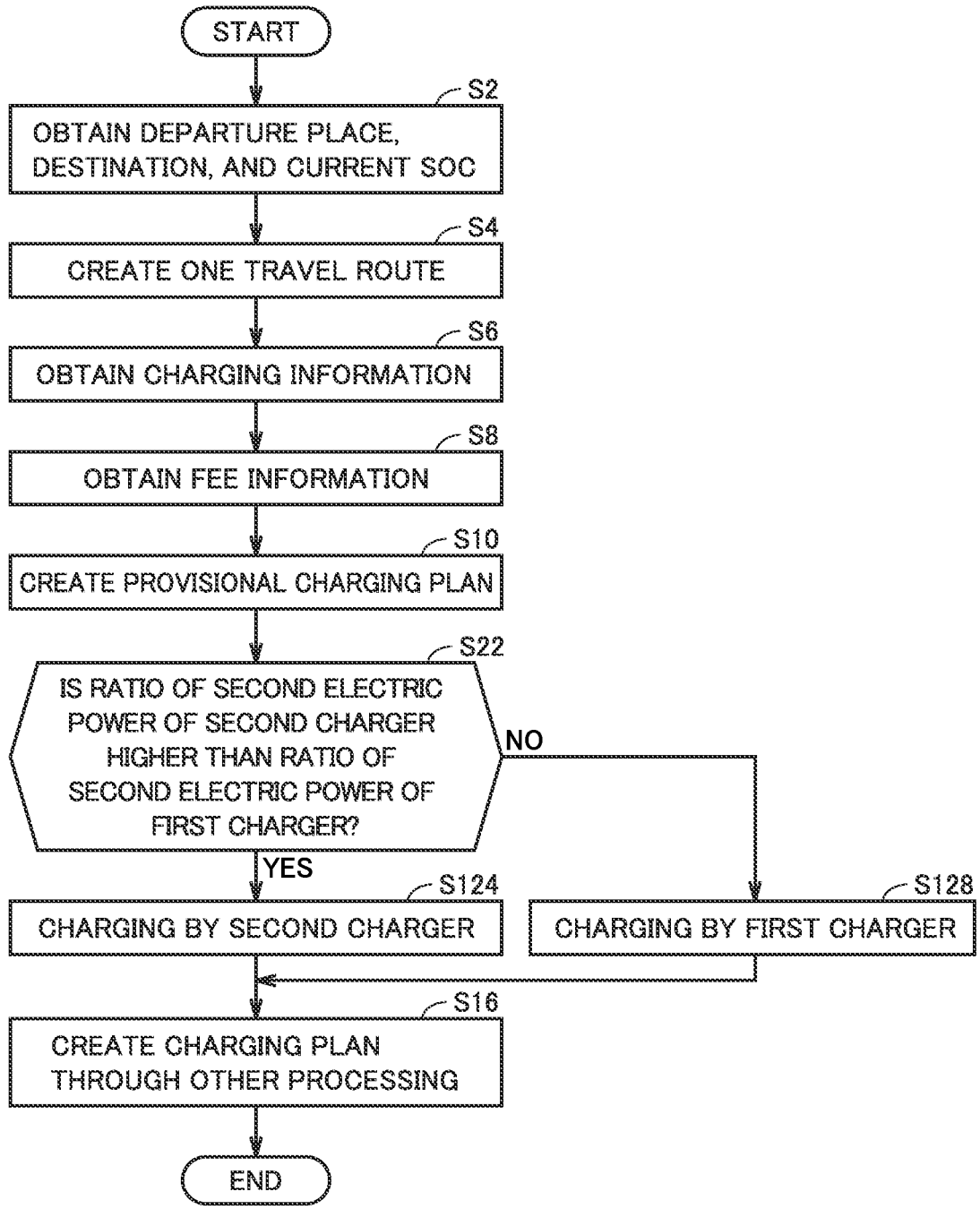

A first modification of the second embodiment will now be described. FIG. 12 is a flowchart of this first modification. When FIG. 11 is compared with FIG. 12, in FIG. 12, step S24 is replaced with step S124 and step S28 is replaced with step S128.

When determination as YES is made in step S22 in the flowchart of the modification in FIG. 12, in step S124, computing device 21 determines that charging by the second charger is to be carried out and charging by the first charger is not to be carried out.

When determination as NO is made in step S22, in step S128, computing device 21 determines that charging by the first charger is to be carried out and charging by the second charger is not to be carried out.

As set forth above, computing device 21 creates such a charging plan that the ratio of charging by the second charger which is higher in ratio of second electric power is higher than the ratio of charging by the first charger which is higher in ratio of first electric power. According to such a configuration as well, computing device 21 can create the charging plan in which charging higher in ratio of second electric power is carried out, and consequently can create the charging plan that can contribute to protection of the global environment.

Third Embodiment

The configuration in which computing device 21 creates one travel route is described in the embodiments above. In a third embodiment, computing device 21 creates a plurality of (S) travel routes, S being an integer not smaller than two. In the present embodiment, computing device 21 creates S travel routes by extracting S travel routes in the ascending order of a length of a travel time period among a plurality of routes from the departure place to the destination.

Figure 13:
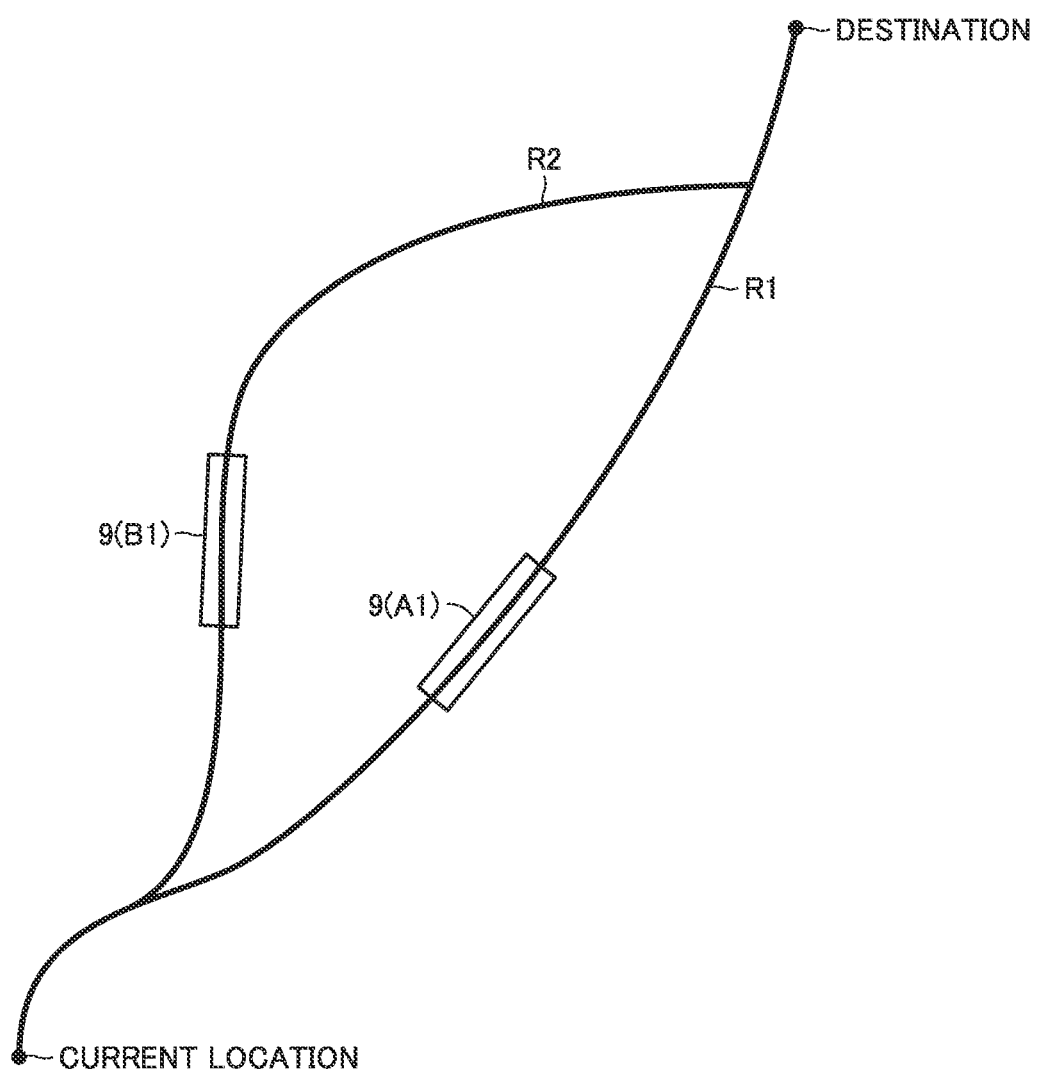
FIG. 13 is a diagram showing the travel route and the charging plan in another embodiment.

In the present embodiment, it is assumed that S is set to two. In other words, computing device 21 creates a first travel route and a second travel route as the plurality of travel routes. FIG. 13 is a diagram schematically showing a first travel route R1, a second travel route R2, and the charging plan. In an example in FIG. 13, it is assumed that the first charger (charger A1) is arranged on first travel route R1 and the second charger (charger B1) is arranged on second travel route R2.

Figure 14:
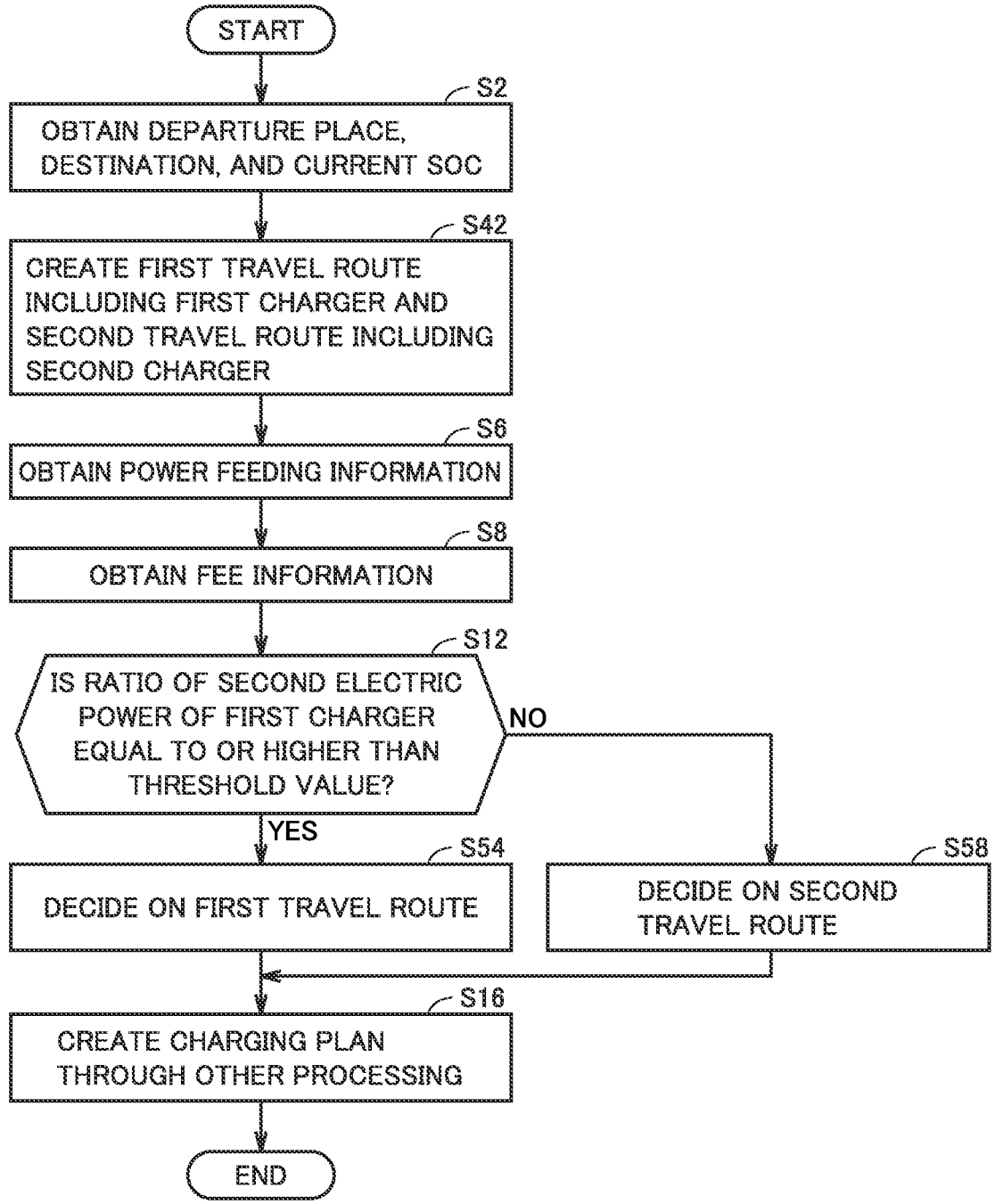
FIGS. 14 and 15 are each a flowchart showing processing in the computing device in other embodiments.

FIG. 14 is a flowchart of computing device 21 in the third embodiment. In step S42 following processing in step S2, computing device 21 creates the first travel route and the second travel route.

Then, in step S12, whether or not the ratio of second electric power of the first charger is equal to or higher than a threshold value is determined. When determination as YES is made in step S12, the process proceeds to step S54. In step S54, computing device 21 decides on the first travel route where the first charger is present. When determination as NO is made in step S12, the process proceeds to step S58. In step S58, computing device 21 decides on the second travel route where the second charger is present.

In following step S16, computing device 21 determines the charger for charging and the amount of charging by the charger on the route determined in step S54 or S58. In this step S16, computing device 21 creates the charging plan. According to such a configuration as well, computing device 21 can create the charging plan in which charging higher in ratio of second electric power is carried out, and consequently can create the charging plan that can contribute to protection of the global environment.

Figure 15:
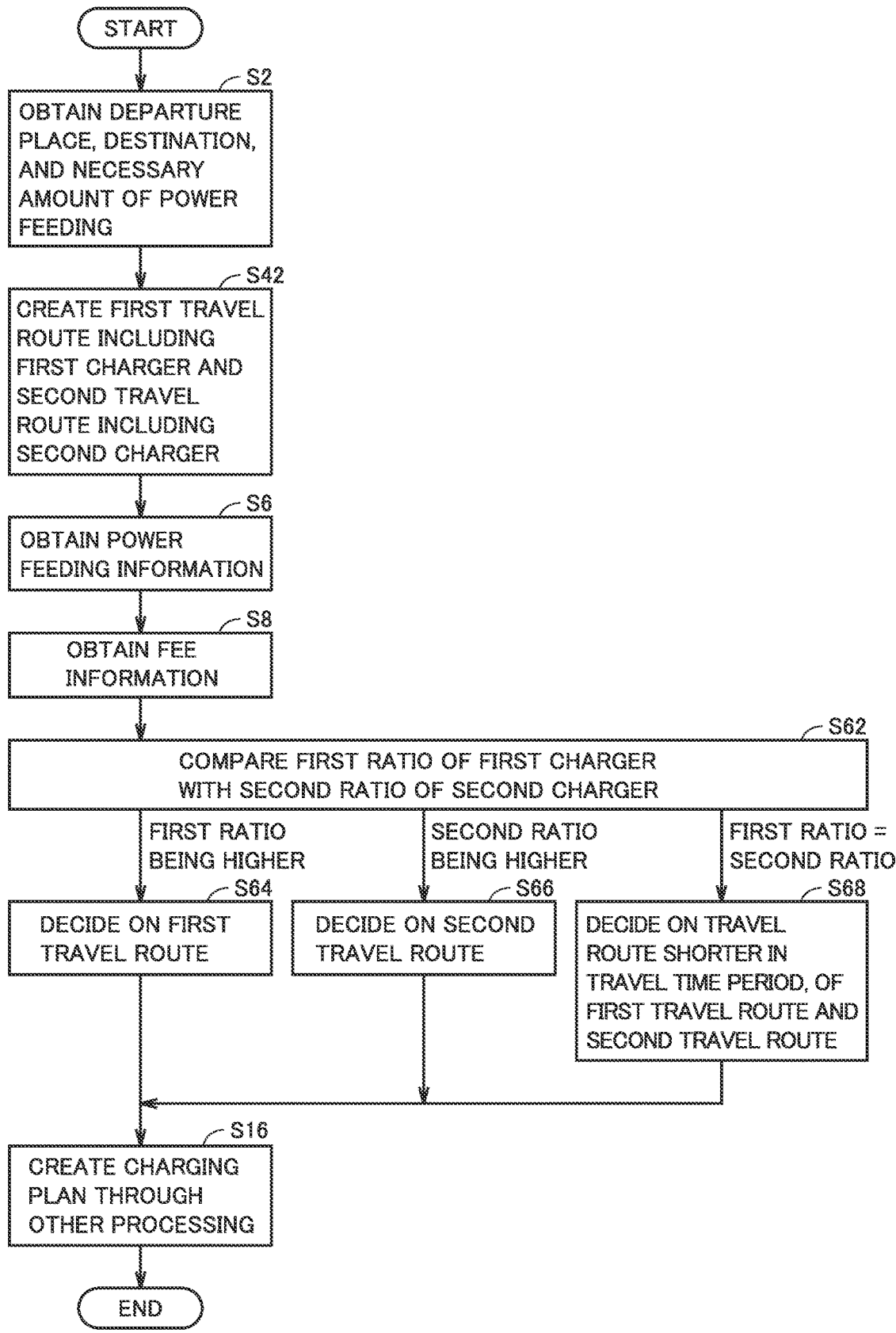

A modification of the third embodiment will now be described. FIG. 15 is a flowchart of this modification. When FIG. 14 is compared with FIG. 15, in FIG. 15, step S12 is replaced with step S62, processing in steps S54 and S58 is omitted, and steps S64, S66, and S68 are added.

In step S62 in FIG. 15, the first ratio of the first charger (the ratio of second electric power of the first charger) is compared with the second ratio of the second charger (the ratio of second electric power of the second charger). When the first ratio is higher than the second ratio, the process proceeds to step S64. When the first ratio is lower than the second ratio, the process proceeds to step S66. When the first ratio and the second ratio are equal to each other, the process proceeds to step S68. In determination in step S62, a tolerance is considered. For example, even when there is a difference between the first ratio and the second ratio, the first ratio and the second ratio are determined as being equal so long as the difference is equal to or smaller than the tolerance.

In step S64, computing device 21 decides on the first travel route where the first charger is present. In step S66, computing device 21 decides on the second travel route where the second charger is present. In step S68, computing device 21 selects any one of the first travel route and the second travel route based on a prescribed parameter. In an example in FIG. 15, a travel time period is adopted as the prescribed parameter. In other words, computing device 21 selects a travel route shorter in travel time period from the first travel route and the second travel route.

With a configuration as in FIG. 15 as well, computing device 21 can create the charging plan in which charging higher in ratio of second electric power is carried out, and consequently can create the charging plan that can contribute to protection of the global environment. When the first ratio and the second ratio are equal between first travel route R1 and second travel route R2, computing device 21 decides on the travel route shorter in travel time period. Therefore, the travel route and the charging plan short in travel time period can be created.

Fourth Embodiment

The example in which the ratio of first electric power and the ratio of second electric power are defined for each charger as shown in FIG. 5 is described in the embodiments above. The ratio of first electric power and the ratio of second electric power, however, may be defined for each of other attributes. Other attributes may include, for example, a region. In other words, the ratio of first electric power and the ratio of second electric power may be defined for each region.

FIG. 16 is a diagram showing the charging information database in an example where the ratio of first electric power and the ratio of second electric power are defined for each region. In the example in FIG. 16, the region position information, the ratio of first electric power, the ratio of second electric power, the charging unit price, and the charging type are associated for each region.

The ratio of first electric power is expressed, for example, by a value based on the ratios of first electric power of all chargers present in the region corresponding thereto. For example, the ratio of first electric power may be an average value of the ratios of first electric power of all chargers present in the region corresponding thereto. Alternatively, the ratio of first electric power may be a median value of the ratios of first electric power of all chargers present in the region corresponding thereto.

The ratio of second electric power is expressed, for example, by a value based on the ratios of second electric power of all chargers present in the region corresponding thereto. For example, the ratio of second electric power may be an average value of the ratios of second electric power of all chargers present in the region corresponding thereto. Alternatively, the ratio of second electric power may be a median value of the ratios of second electric power of all chargers present in the region corresponding thereto.

The charging unit price may be expressed, for example, by a value based on the charging unit prices of all chargers present in the region corresponding thereto. For example, the charging unit price may be an average value of the charging unit prices of all chargers present in the region corresponding thereto. Alternatively, the charging unit price may be a median value of the charging unit prices of all chargers present in the region corresponding thereto.

The charging type is defined as wireless charging in all regions. In other words, in the example in FIG. 16, the ratio of first electric power, the ratio of second electric power, and the charging unit price of chargers adapted to wireless charging among all chargers in each region are defined.

Computing device 21 creates the charging plan with the use of the charging information database in FIG. 16. In other words, computing device 21 creates the charging plan based on first region information and second region information. In the example in FIG. 16, the first region information is information associated with region A (for example, the ratio of first electric power and the ratio of second electric power). The second region information is information associated with region B.

In the charging information database in this FIG. 16, charging information for each charger is not defined. Therefore, the charging information database in FIG. 16 can be smaller in amount of information than the charging information database in FIG. 5. Therefore, a storage capacity of the charging information database can be reduced. Even with the charging information database as in FIG. 16, computing device 21 can create the charging plan in which charging higher in ratio of second electric power is carried out, and consequently can create the charging plan that can contribute to protection of the global environment.

Fifth Embodiment

Figure 17:
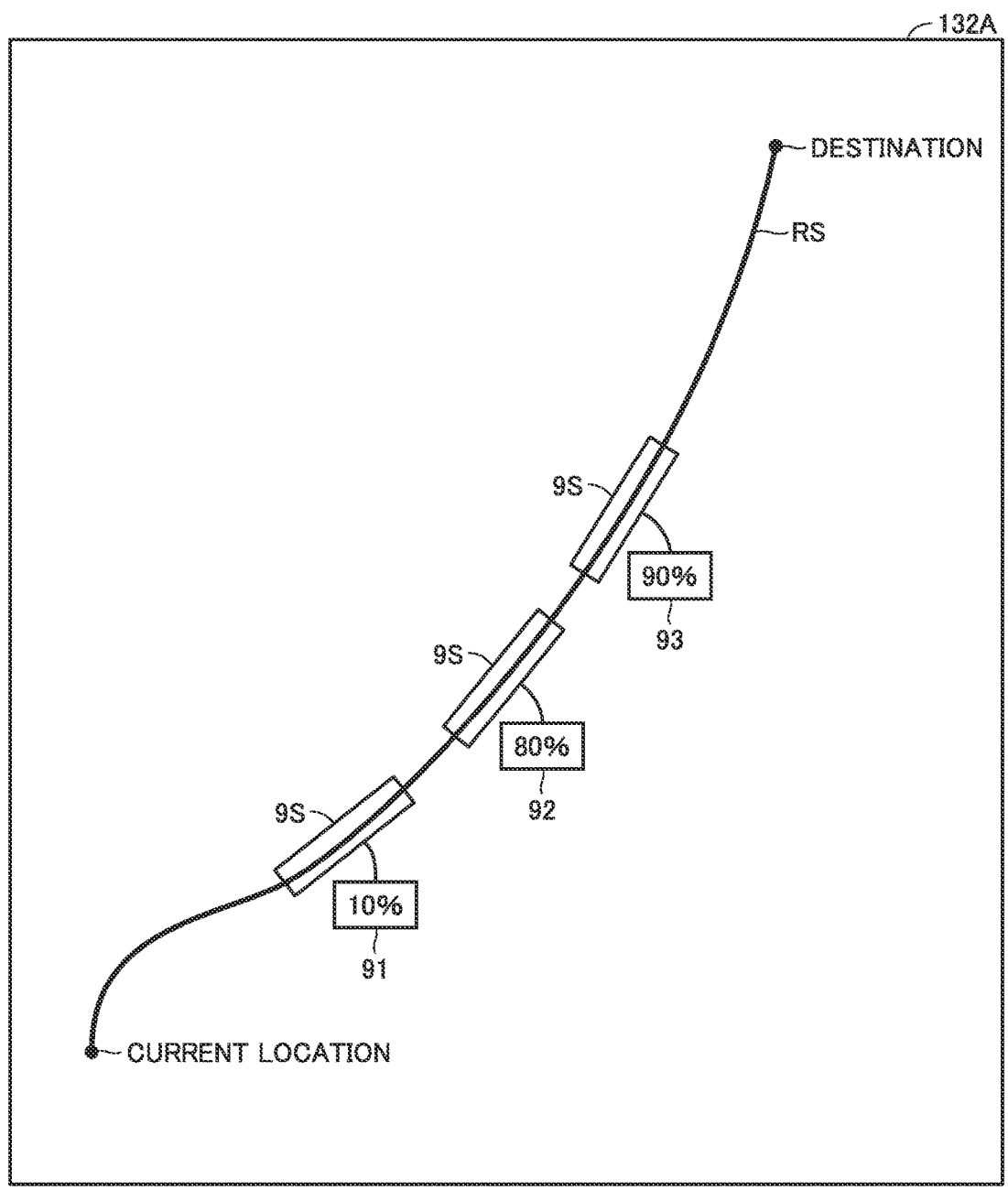
FIG. 17 is a diagram showing a screen on which the travel route and the charging plan are shown.

Computing device 21 in a fifth embodiment has the travel route and the charging plan shown on display 132 (see FIG. 2). FIG. 17 shows an exemplary screen on which the travel route and the charging plan are shown. The travel route and the charging plan are shown in a display area 132A of display 132.

The example in FIG. 17 shows a route image RS of the travel route from the departure place to the destination. An image of the charging plan is shown. In the example in FIG. 17, the image of the charging plan includes charger images 9S of three chargers. These three charger images 9S show that vehicle 1 is charged by the chargers shown in charger images 9S. Charger images 9 are shown in association with route image RS.

In the example in FIG. 17, second electric power information is shown in association with each charger image 9S. The second electric power information is information indicating the ratio of second electric power. The example in FIG. 17 shows second electric power information 91 including a numerical value 10% in first charger image 9S. This second electric power information 91 indicates that the ratio of second electric power of the charger shown in first charger image 9S is 10%.

In the example in FIG. 17, second electric power information 92 including a numerical value 80% is shown in second charger image 9S. Second electric power information 93 including a numerical value 90% is shown in third charger image 9S.

Thus, computing device 21 in the fifth embodiment has route image RS and charger image 9S of the charger (the first charging position) shown on display 132. Therefore, a user (for example, a driver) can recognize a charging position. In particular, even when the charger is adapted to contact charging, computing device 21 can have the user recognize the position of the charger that carries out contact charging. Therefore, computing device 21 can encourage the user to carry out charging with the use of the charger adapted to contact charging.

Computing device 21 causes charger image 9S of the charger (first charging position) and second electric power information 91 indicating the first ratio (the ratio of second electric power) to be shown in association with each other. Therefore, computing device 21 can have the user recognize the ratio of second electric power of the charger together with a location of the charger for charging.

Other Embodiments (1) Computing device 21 may create the travel route and the charging plan associated with each of a plurality of parameters. Computing device 21 presents to the user, a plurality of created travel routes and charging plans, and has the user select a travel route and a charging plan.

Figure 18:
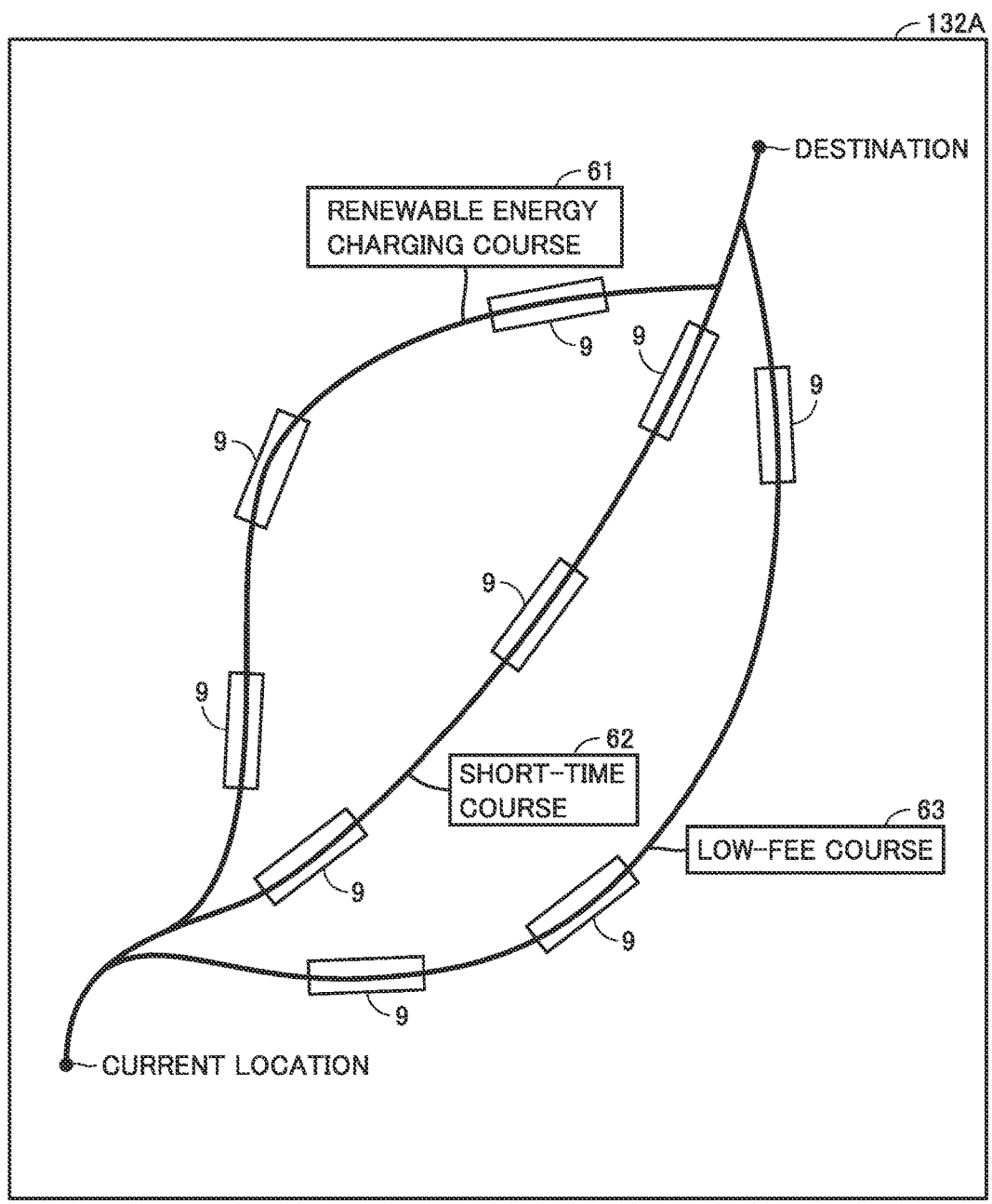
FIG. 18 is a diagram showing a screen on which a plurality of travel routes and a plurality of charging plans are shown.

FIG. 18 is a diagram showing exemplary representation of a plurality of travel routes and a plurality of charging plans. In an example in FIG. 18, travel parameters include a ratio of charging with second electric power, a travel time period, and a charging fee. Computing device 21 creates a travel route and a charging plan high in ratio of charging with second electric power, a travel route and a charging plan short in travel time period, and a travel route and a charging plan inexpensive in charging fee. Computing device 21 causes the travel route and the charging plan and parameter information with which a parameter corresponding to the travel route and the charging plan can be specified to be shown in display area 132A on display 132.

In the example in FIG. 18, computing device 21 causes the travel route and the charging plan high in ratio of charging with second electric power and parameter information 61 to be shown. Parameter information 61 is information indicating that the ratio of charging with second electric power is high. In the example in FIG. 18, parameter information 61 is information labeled as a "renewable energy charging course."

Computing device 21 causes the travel route and the charging plan short in travel time period and parameter information 62 to be shown. Parameter information 62 is information indicating that the travel time period is short. In the example in FIG. 18, parameter information 62 is information labeled as a "short-time course."

Computing device 21 causes the travel route and the charging plan inexpensive in charging fee and parameter information 63 to be shown. Parameter information 63 is information indicating that the charging fee is inexpensive. In the example in FIG. 18, parameter information 63 is information labeled as a "low-fee course."

Parameter information 61, parameter information 62, and parameter information 63 are shown in such a manner that a user can designate any of them. When the user designates any of parameter information 61, parameter information 62, and parameter information 63, ECU 11 sets the travel route and the charging plan corresponding to the designated parameter information.

Computing device 21 that has a screen in the example in FIG. 18 shown can set the travel route and the charging plan that suit preference of the user.

(2) The user may select the travel parameter and computing device 21 may create the travel route and the charging plan based on the selected travel parameter.

Figure 19:
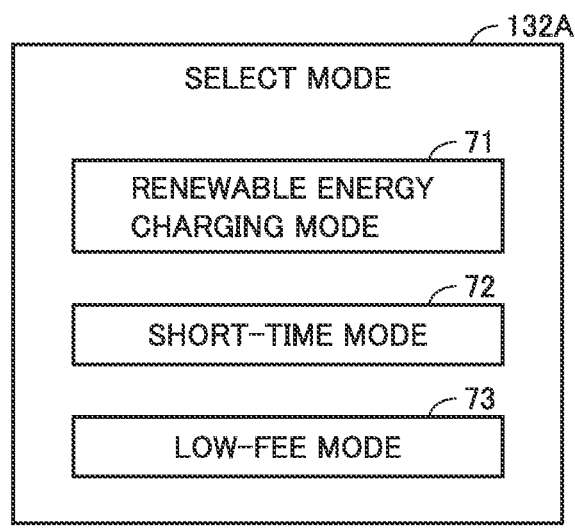
FIG. 19 is a diagram showing a mode setting screen.

FIG. 19 is a diagram showing an exemplary mode setting screen. The mode setting screen is a screen shown in display area 132A. In an example in FIG. 19, a renewable energy charging mode button 71, a short-time mode button 72, and a low-fee mode button 73 are shown.

When the user designates renewable energy charging mode button 71, computing device 21 creates the travel route and the charging plan high in ratio of charging with second electric power. When the user designates short-time mode button 72, computing device 21 creates the travel route and the charging plan short in travel time period. When the user designates low-fee mode button 73, computing device 21 creates the travel route and the charging plan inexpensive in charging fee. Then, computing device 21 sets the created travel route and charging plan.

According to such a configuration as well, computing device 21 can set the travel route and the charging plan that suit preference of the user.

Even in the configuration in FIG. 19 in which the screen is not shown, computing device 21 may create the travel route and the charging plan by weighting each of at least two of the parameters.

(3) In the present embodiment, a configuration in which computing device 21 performs all flowcharts shown in FIGS. 9 to 12, 14, and 15 is described. Vehicle system 100 in which ECU 11 of vehicle 1 performs at least one of the flowcharts shown in FIGS. 9 to 12, 14, and 15, however, may be adopted. According to such a configuration as well, vehicle system 100 can create the charging plan in which charging high in ratio of second electric power is carried out, and consequently create the charging plan that contributes to protection of the global environment.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A computing device comprising:
   a processor that creates a travel route of a vehicle and a charging plan on the travel route; and
   a memory in which a program executable by the processor is stored, wherein
   the vehicle is charged with electric power supplied from one of a plurality of charging positions, and travels by consuming the electric power,
   the electric power supplied from the one of the plurality of charging positions includes first electric power and second electric power,
   generation of a unit amount of the first electric power causes emission of a first amount of carbon dioxide,
   generation of the unit amount of the second electric power causes emission of a second amount of carbon dioxide, the second amount being smaller than the first amount,
   the plurality of charging positions includes a first charging position on the travel route of the vehicle,
   the processor creates the charging plan based on a first ratio of an amount of the second electric power supplied from the first charging position to a total amount of electric power supplied from the first charging position,
   the processor creates a provisional charging plan, and
   the processor creates the charging plan with an amount of charging at the first charging position being set to be larger than in the provisional charging plan, when the first ratio in the provisional charging plan is equal to or higher than a threshold value.

2. The computing device according to claim 1, wherein
   the plurality of charging positions includes
   the first charging position, and
   a second charging position that supplies electric power with a second ratio of an amount of the second electric power supplied from the second charging position to a total amount of electric power supplied from the second charging position being higher than the first ratio, and
   the processor creates the charging plan based on the first ratio and the second ratio.

3. The computing device according to claim 2, wherein the processor creates the charging plan in which charging is not carried out at the first charging position but carried out at the second charging position.

4. The computing device according to claim 2, wherein the processor creates one travel route including the first charging position and the second charging position.

5. The computing device according to claim 2, wherein the processor creates
   a first travel route including the first charging position, and
   a second travel route including the second charging position.

6. The computing device according to claim 5, wherein the processor creates the charging plan on the travel route shorter in travel time period, of the first travel route and the second travel route.

7. The computing device according to claim 2, wherein the processor creates the charging plan based on information on a first region including the first charging position and information on a second region including the second charging position.

8. The computing device according to claim 1, wherein the processor creates the charging plan to lower a fee for charging the vehicle.

9. The computing device according to claim 1, wherein the processor controls a display to show an image of the travel route and an image of the first charging position.

10. The computing device according to claim 9, wherein the processor controls the display to show the image of the first charging position and an image of the first ratio in association with each other.

11. The computing device according to claim 1, wherein the first electric power is generated using depletable energy, and
the second electric power is generated using renewable energy.

12. The computing device according to claim 1, wherein the processor creates the charging plan including wireless charging of the vehicle.

13. A vehicle system comprising:
a server apparatus; and
a vehicle, wherein the vehicle is charged with electric power supplied from one of a plurality of charging positions, and travels by consuming the charged electric power, the supplied electric power includes first electric power and second electric power, the first electric power is electric power, generation of a unit amount of which causes emission of a first amount of carbon dioxide, the second electric power is electric power, generation of the unit amount of which causes emission of a second amount of carbon dioxide, the second amount being smaller than the first amount the plurality of charging positions includes a first charging position on a travel route of the vehicle, and the vehicle system
- creates a charging plan on a travel route of the vehicle based on a first ratio of an amount of the second electric power supplied from the first charging position to a total amount of electric power supplied from the first charging position
- creates a provisional charging plan, and
- creates the charging plan with an amount of charging at the first charging position being set to be larger that in the provisional charging plan, when the first ratio in the provisional charging plan is equal to or higher than a threshold value.

14. A method relating to a vehicle, the vehicle charged with electric power supplied from one of a plurality of charging positions, and the vehicle traveling by consuming the charged electric power, the supplied electric power includes first electric power and second electric power, the first electric power being electric power, generation of a unit amount of which causes emission of a first amount of carbon dioxide, the second electric power being electric power, generation of the unit amount of which causes emission of a second amount of carbon dioxide, the second amount being smaller than the first amount, the plurality of charging positions includes a first charging position on a travel route of the vehicle, the method comprising:
- obtaining a first ratio of an amount of the second electric power supplied from the first charging position on the travel route of the vehicle to a total amount of electric power supplied from the first charging position on the travel route of the vehicle;
- creating a charging plan on the travel route of the vehicle based on the first ratio;
- creating a provisional charging plan; and
- creating the charging plan with an amount of charging at the first charging position being set to be larger than in the provisional charging plan, when the first ratio in the provisional charging plan is equal to or higher than a threshold value.

* * * * *